April 23, 1968   D. J. DOMIZI   3,379,853
IMPEDOR FOR A TUBE MILL
Filed May 22, 1964   2 Sheets-Sheet 2
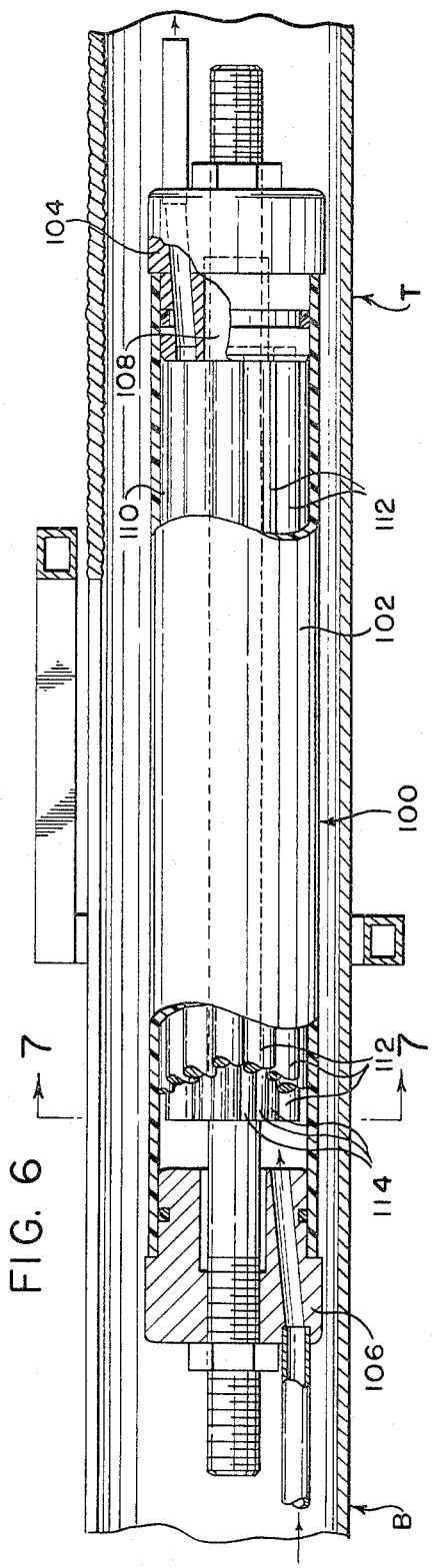
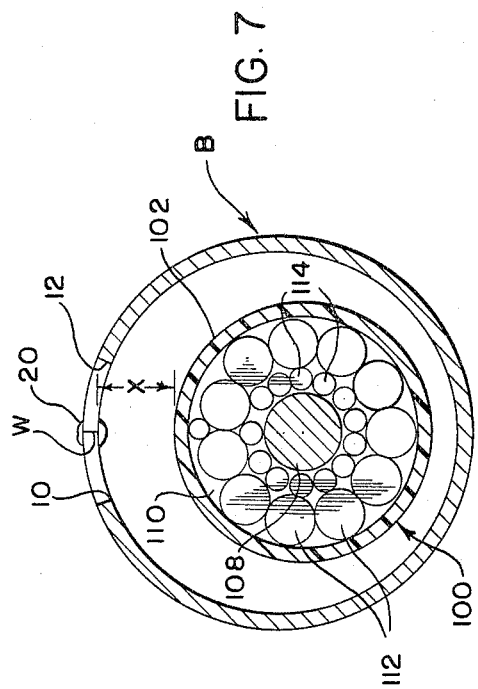
INVENTOR.
DANTE J. DOMIZI
BY
*Tillbury & Body*
ATTORNEYS United States Patent Office 3,379,853
Patented Apr. 23, 1968

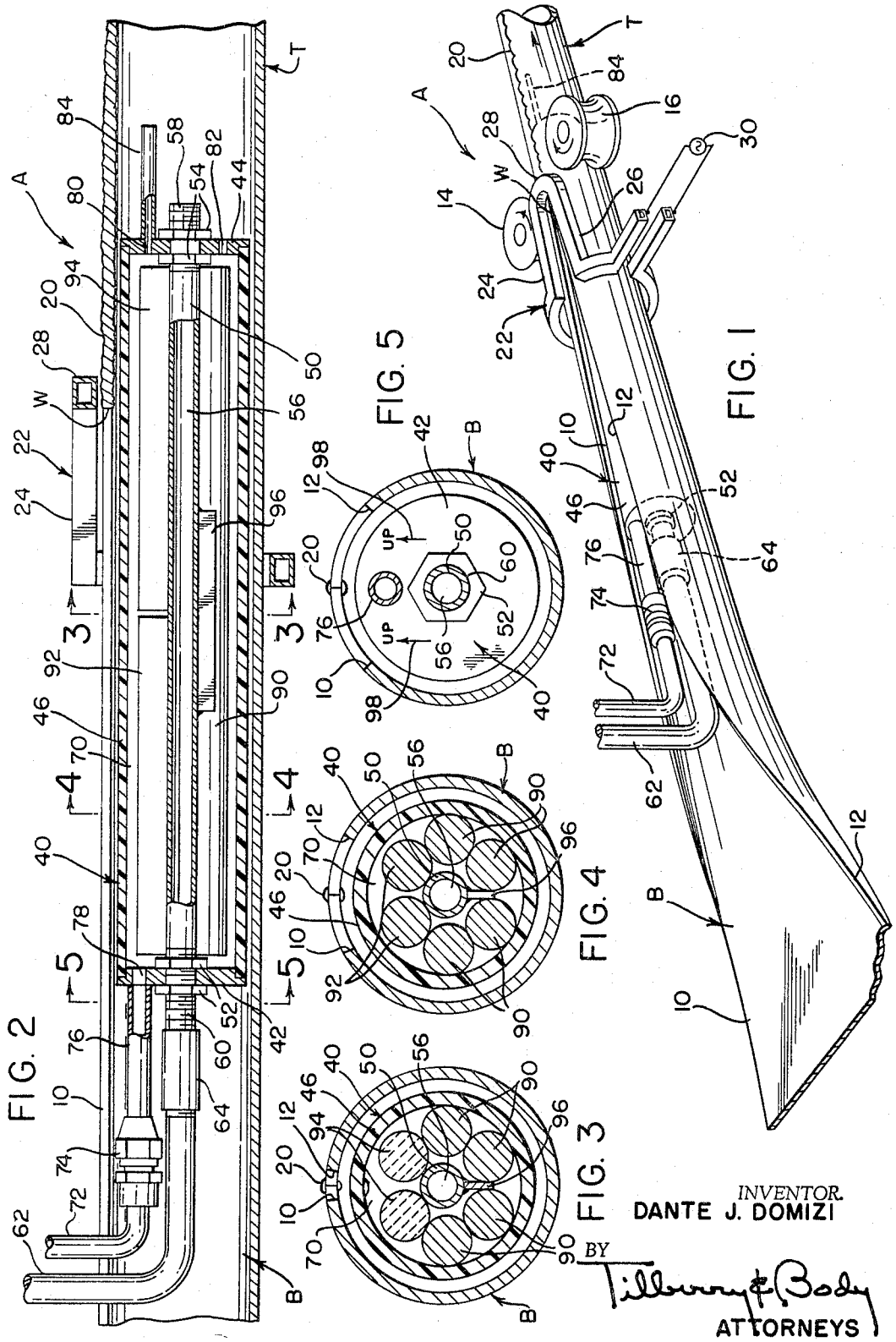

3,379,853
IMPEDOR FOR A TUBE MILL
Dante J. Domizi, Parma, Ohio, assignor to Park-Ohio Industries, Inc., a corporation of Ohio
Filed May 22, 1964, Ser. No. 369,570
14 Claims. (Cl. 219—8.5)

ABSTRACT OF THE DISCLOSURE

There is provided an impedor for a tube mill for forming a longitudinally moving skelp having spaced edges into a continuous seam welded tube. The impedor includes a sleeve of electrical insulation material extending in the skelp and below the point at which the skelp is seam welded into a tube. Within the sleeve there are provided a plurality of circumferentially positioned rod-like elements with the element or elements opposite the welding point having a low permeability and the elements radially remote from the welding point having high permeability.

Disclosure

The present invention pertains to the art of tube mills and more particularly to an impedor for a tube mill.

This invention is particularly applicable to an impedor for a tube mill which uses induction heating for welding the converging edges of an advancing skelp into a continuous tube or tubing and it will be described with particular reference thereto; however, it will be appreciated that the invention has much broader applications and an impedor, constructed in accordance with the present invention, may be used in a tube mill of the type which uses conduction heating, instead of induction heating, for welding the converging edges of the advancing skelp.

Seam welded metal tubing is generally formed by an apparatus, usually referred to as a tube mill, wherein a flat metal strip, known as a skelp, is formed into a tube or tubing by bringing the edges of the skelp together and then seam welding the edges to form the tubing. As the metal skelp is moving longitudinally through the tube mill, the edges gradually converge at a point, generally referred to as the welding point, and an alternating current is caused to flow along the converging edges and across the welding point. In this manner, the converging edges are preheated and then raised to the welding temperature at the welding point, where they are welded together. In accordance with the contemplation of the present invention, the current flow along the converging edges and across the welding point is caused by an inductor spaced above the edges and the welding point and energized by a high frequency power source. In such an apparatus, it has become common practice to provide an impedor within the tube or tubing and directly below the converging edges and the welding point. This impedor is formed from a high magnetic permeability material, such as a ferrite, and causes the current to be concentrated along the edges and across the welding point.

In order to efficiently and uniformly weld the converging edges, current must be concentrated along the edges. Without an impedor, especially when relatively heavy gage pipe is being welded, the internal surface of the pipe or tube tends to form a relatively low resistance shunt which allows circulation of currents around the pipe and away from the edges. The impedor overcomes this difficulty by increasing the impedance of the internal surface if the impedor has high magnetic permeability and is close to the internal surface. The larger the gap between the edges and the longer the spacing between the body of the inductor and the welding point, the more such an impedor is required for successful welding.

The most successful high permeability material used in the construction of a tube mill impedor is formed from particles of ferrite, or a similar material, sintered together by application of heat and pressure or bonded together by a non-conductive matrix. Such material is usually formed into the desired shape by filling a mold with the high permeability material, in the form of a powder, and then applying a high pressure to the powdered material as it is heated. Because of the high pressure required to form this high permeability material into the desired shape, and the cost of the molds for performing this function, the sintered or bonded high permeability material is generally available only in the form of relatively small rods or disks. Any other shape, especially a larger shape, is considerably more expensive.

For an impedor to function properly within a tube mill, it must have an outer contour which generally matches the inner contour of the tube or tubing being formed so that the high permeability material of the impedor is spaced relatively close to the internal surface of the tubing being welded. Consequently, when the tube mill is being used to form relatively large tubing, it is necessary that the high permeability material has a relatively larger outer cylindrical surface. This requirement of a large outer cylindrical surface has heretofore made it impossible to utilize the relatively inexpensive, small rod-shaped or disk-shaped sintered or bonded high permeability material for an impedor to be used in a tube mill welding a relatively large tube or tubing. Thus, when a relatively large tube or tubing was being welded in the tube mill, the cost of the impedor was extremely high, if the sintered or bonded material was used, or the impedor was formed from a less desirable high permeability material.

These disadvantages have been overcome by the present invention which is directed toward an impedor for a tube mill forming a relatively large tube or tubing which impedor utilizes the commercially available, small rod or rod-like elements of sintered or bonded high magnetic permeability material. Also, the rod-like elements provide more surface area for cooling of the impedor.

In accordance with the present invention there is provided an impedor of the type described above which impedor comprises a sleeve of electrical insulation material extending in the skelp and below the welding point and having an outer cylindrical surface closely spaced from the inner surface of the skelp, a support rod extending through the sleeve and generally coaxial with the cylindrical surface of the sleeve to define an annular chamber within the sleeve, a plurality of small, rod-like elements of high permeability in the annular space.

The primary object of the present invention is the provision of an impedor for a tube mill which impedor is highly efficient in operation, easy to install, economical to produce and easily cooled during operation.

Another object of the present invention is the provision of an impedor for a tube mill which impedor utilizes a plurality of relatively small, high permeability rod-like elements to construct a relatively large diameter impedor for use in a tube mill welding a relatively large tube or tubing.

These and other objects and advantages will become apparent from the following description used to illustrate the preferred embodiment of the present invention as read in connection with the accompanying drawings in which:

FIGURE 1 is a perspective, somewhat schematic view illustrating the preferred embodiment of the present invention;

FIGURE 2 is a partial, cross-sectional, side elevational view illustrating the preferred embodiment of the present invention;

FIGURE 3 is a cross-sectional view taken generally along line 3—3 of FIGURE 2;

FIGURE 4 is a cross-sectional view taken generally along line 4—4 of FIGURE 2;

FIGURE 5 is a cross-sectional view taken generally along line 5—5 of FIGURE 2;

FIGURE 6 is a partially cross-sectioned, somewhat schematic, side elevational view illustrating a modification of the preferred embodiment of the invention; and, FIGURE 7 is a cross-sectional view taken generally along line 7—7 of FIGURE 6.

Referring now to the drawings wherein the showings are for the purpose of illustrating a preferred embodiment of the present invention only and not for the purpose of limiting same, FIGURE 1 shows a tube mill A for forming skelp B into relatively large welded tubing T. In forming the tubing T, the edges 10, 12 of skelp B are forced to converge at the welding point W by a pair of pressure rolls 14, 16. A plurality of pressure rolls may be provided; however, for the purpose of simplicity, only rolls 14 and 16 are illustrated. Thereafter, in a manner to be hereinafter described, the converging edges 10, 12 are welded at a seam 20 so that the tubing T is a unitary structure.

To accomplish the welding operation, there is provided, in accordance with the preferred embodiment of the present invention, an inductor 22 surrounding the skelp B and having legs 24, 26 positioned above the converging edges 10, 12, respectively, and a nose 28 extending toward the welding point W. As the high frequency current is caused to flow within inductor 22 by a high frequency power source, schematically represented as generator 30, voltage potentials are induced within the skelp B and these induced voltage potentials create current flow along the edges and across the welding point. This current flow generates $I^2R$ heating within the converging edges and across the welding point so that the edges are preheated before reaching the welding point W and, when reaching the welding point, are raised to a temperature sufficient to allow pressure welding by the squeezing action of the pressure rolls 14, 16. The pressure welding of the converging edges causes the metal in edges 10, 12 to upset slightly which create an upper and a lower bead as shown in FIGURES 3, 4 and 5. This bead is subsequently removed from the tubing T by internal and external skiving tools, not shown.

More efficient heating of the converging edges 10, 12 can be accomplished by providing an impedor within the tubing T and below the welding point W. Such an impedor is used to cause a concentration of current along the converging edges and at the welding point. In accordance with the embodiment of the present invention as shown in FIGURES 1–5, there is provided an impedor 40 having spaced, generally disk-shaped, end plates 42, 44 joined by a cylindrical outer sleeve 46, formed from a non-conductive, low permeability, heat resistant material, which in practice is glass, glass laminate or Teflon. Since the sleeve 46 usually does not have sufficient transverse rigidity to maintain a coaxial relationship with respect to tubing T, when mounted in cantilever fashion within the tubing, there is provided a hollow support tube 50 adapted to secure the end plates 42, 44 in spaced parallel relationship so that the end plates support the sleeve 46 in the proper relationship with respect to the tubing T. The tube 50 is fixedly coupled onto the end plate 42 by a pair of nuts 52 and onto end plate 44 by a pair of nuts 54. It is appreciated that other mechanical arrangements could be provided for supporting the sleeve 46 within the tubing T. The use of the Teflon sleeve has proven unexpectedly beneficial in practice. Molten metal splattering from the welding point W has been found to erode only about halfway through the Teflon sleeve when the sleeve is approximately .060 inch in thickness. Thereafter, the sleeve does not erode any further and the sleeve, thus, forms a permanent protector for the impedor rods.

The support tube 50 is provided with an axially extending coolant passage 56, a forward threaded extension 58 for mounting an internal skiving tool, not shown, and a rearward threaded extension 60 for coupling the support tube 50 onto a support arm 62 by a nipple 64. Water, or another appropriate coolant, is directed through the passage 56 so that a coolant can be supplied to the internal skiving tool which is mounted within tubing T and on the right end of impedor 40 as it is viewed in FIGURE 2.

The sleeve 46 and tube 50 form an annular chamber 70 which is generally concentric with the tubing T in the area where edges 10, 12 are converging into the welding point W. A coolant, such as water, is circulated through chamber 70 from a supply line 72 having a terminal coupling 74 connected onto a coolant tube 76. The tube 76 directs coolant through inlet orifice 78 into chamber 70 and the coolant then passes through the chamber 70 and flows into tubing T by way of upper outlet orifice 80 and lower outlet orifice or orifices 82. The seam 20 should not be rapidly cooled immediately behind the welding point W; therefore, the upper outlet orifice 80 is provided with an outlet tube 84 which directs the coolant from orifice 80 to a position remote from the welding point W. It is appreciated that other arrangements could be provided for circulating coolant through the impedor 40; however, the arrangement illustrated in the preferred embodiment of the present invention has proven satisfactory in practice.

Within annular chamber 70 of the embodiment shown in FIGURES 1–5, there are provided a plurality of small, rod-like elements 90 extending substantially the complete length of impedor 40 and two short rod-like elements 92 positioned in the upper portion of the annular chamber 70 in a position remote from the welding point W. The rod-like elements 90, 92 are formed from sintered or bonded, high permeability material having a diameter substantially smaller than the external diameter of sleeve 46. By positioning the rod-like elements 90, 92 within the annular chamber 70, the impedor 40 presents a high permeability material closely spaced from the internal surface of tubing T at all areas of the tubing except at the area adjacent the welding point W. In the annular chamber 70 directly adjacent the welding point W, there are provided two rod-like elements formed from a low permeability, non-conductive material, such as glass or ceramic. By providing the low permeability material adjacent the welding point and the converging edges immediately before the welding point, the remainder of the impedor prevents circulation of currents on the internal surface of the tubing T and, thus, concentrates current flow within the converging edges and across the welding point. This concentration of current flow greatly enhances the operating efficiency of the tube mill A.

The complete circumference of impedor 40 presents a high permeability material to the internal surface of tubing T, or skelp B, in the area in front of the welding point W as shown in FIGURE 4; however, at the welding point W, the impedor 40 presents high permeability material to the internal surface of tubing T, except immediately adjacent the welding point as shown in FIGURE 3. It is appreciated that the number and size of the small rod-like elements, be they high permeability or low permeability, can be varied without changing the operating characteristics of impedor 40. The number of small rod-like elements illustrated in the drawings is representative in nature and may be varied without departing from the intended spirit and scope of the present invention.

Since the small rod-like elements 94 must be maintained immediately opposite the welding point W, there is provided an aligning bar 96 secured onto the tube 50. This bar prevents rotation of the rod-like elements within chamber 70. The end plate 42 is provided with indicia 98 to indicate the portion of the impedor 40 which is to face the welding point W. Consequently, in mounting impedor 40 within the tube mill A, the impedor should be positioned so that the rod-like elements 94 are adjacent the welding point which position is evidenced by the indicia 98.

Referring now to the embodiment of the invention shown in FIGURES 6 and 7, an impedor 100 has a glass laminate sleeve 102, or a sleeve of similar material such as heat resistant glass or Teflon, supported by end plates 104, 106 which are removably mounted onto support rod 108. The support rod and sleeve define an annular chamber 110 which is filled by a plurality of high permeability, sintered or bonded particulate material rods 112 having a diameter of .5 inch and a plurality of similar high permeability rods 114 of a smaller diameter, i.e. approximately .25 inch. The use of both large and small diameter rods provides a more complete packing of chamber 110 so that a more uniform high permeability surface is presented to the internal surface of skelp B or tubing T. The smaller diameter rods 114 are available in shorter lengths than rods 112; therefore, two or more of these rods may be required in the axial direction of impedor 100.

It is noted that the impedor 100 shown in FIGURES 6 and 7 does not have upper low permeability rod or rods as used in the embodiment of the invention shown in FIGURES 1–5; therefore, the impedor 100 is eccentrically mounted within the tubing T as shown in FIGURE 7 with a space $x$ between the welding point W and the top of the impedor. The operation of impedor 100 is similar to the operation of impedor 40.

The present invention has been discussed in connection with a preferred embodiment; however, it is appreciated that various structural changes may be made in this embodiment without departing from the intended spirit and scope of the present invention as defined in the appended claims.

Having thus described my invention, I claim:

1. An impedor for a tube mill for forming a longitudinally moving skelp having spaced edges into a tube, said mill comprising means for forcing said edges to converge at a welding point to form a tube and means for causing a welding current to flow along said edges and across said welding point to weld said edges together, said impedor comprising: a sleeve of electrical insulation material extending in said skelp and below said welding point and having an outer cylindrical surface closely spaced from the inner surface of said skelp, a plurality of circumferentially positioned rod-like elements in said sleeve and spaced only slightly from the internal surface of said skelp, said element or elements opposite said welding point having a low permeability, and said elements radially remote from said welding point having a high permeability.

2. An impedor as defined in claim 1 wherein said sleeve is formed from a low permeability material.

3. An impedor as defined in claim 1 wherein said low permeability elements are formed from a high electrical resistivity material.

4. An impedor as defined in claim 1 wherein there is included in said sleeve a means for preventing circumferential movement of said elements within said sleeve.

5. An impedor as defined in claim 1 including two spaced end plates connected by a support tube extending between said plates, said support tube being coaxial with said sleeve and defining an annular chamber in said sleeve and said rod-like elements being positioned within said chamber.

6. An impedor as defined in claim 5 wherein there is included in said sleeve a means for preventing circumferential movement of said elements within said sleeve.

7. An impedor as defined in claim 5 including means for circulating coolant through said chamber.

8. An impedor as defined in claim 1 wherein said low permeability rod-like elements are formed from glass.

9. An impedor as defined in claim 1 wherein said current causing means is an inductor having spaced legs closely spaced from said converging edges and a nose between said legs closely spaced from said welding point, and a high frequency power source connected onto said inductor.

10. An impedor as defined in claim 1 wherein said sleeve is formed from Teflon.

11. An impedor as defined in claim 1 wherein said high permeability rod-like elements are formed from sintered, high permeability particles.

12. An impedor as defined in claim 1 wherein said high permeability rod-like elements are formed from bonded, high permeability particles.

13. An impedor for a tube mill for forming a longitudinally moving skelp having spaced edges into a tube, said mill comprising means for forcing said edges to converge at a welding point to form a tube and means for causing a welding current to flow along said edges and across said welding point to weld said edges together, said impedor comprising: a sleeve of electrical insulation material extending in said skelp and below said welding point and having an outer cylindrical surface closely spaced from the inner surface of said skelp, a support tube mounted coaxially with said sleeve and defining an annular chamber within said sleeve, a plurality of long high permeability rod-like elements in said chamber and extending substantially the length of said sleeve at circumferential positions radially remote from said welding point, at least one short high permeability rod-like element in said chamber and extending substantially less than the length of said sleeve, said short high permeability element being positioned between said long elements and longitudinally remote from said welding point, at least one short low permeability rod-like element in said chamber and extending substantially less than the length of said sleeve, said short low permeability element being positioned between said long elements and adjacent said welding point, and means for preventing circumferential movement of said elements within said sleeve.

14. An impedor as defined in claim 13 wherein said sleeve is formed from glass laminate.

References Cited

UNITED STATES PATENTS

| | | | |
|---|---|---|---|
| 2,818,488 | 12/1957 | Rudd et al. | 219—59 |
| 2,818,489 | 12/1957 | Kalning et al. | 219—59 |
| 3,037,105 | 5/1962 | Kohler | 219—8.5 |
| 3,209,115 | 9/1965 | Van Iperen | 219—59 |

RICHARD M. WOOD, *Primary Examiner.*

B. A. STEIN, *Assistant Examiner.*